United States Patent
Mehta et al.

(10) Patent No.: US 12,541,345 B2
(45) Date of Patent: Feb. 3, 2026

(54) DYNAMIC PROGRAM CODE ANALYZER TO IMPROVE CODE QUALITY

(71) Applicant: Morgan Stanley Services Group Inc., New York, NY (US)

(72) Inventors: Mayank Bhupendra Mehta, Maharashtra (IN); Dipali Acharya, Mumbai (IN); Chetan Revankar, Mumbai (IN)

(73) Assignee: Morgan Stanley Services Group Inc., New York, NY (US)

( * ) Notice: Subject to any disclaimer, the term of this patent is extended or adjusted under 35 U.S.C. 154(b) by 8 days.

(21) Appl. No.: 18/772,569

(22) Filed: Jul. 15, 2024

(65) Prior Publication Data
US 2026/0017032 A1    Jan. 15, 2026

(51) Int. Cl.
*G06F 8/34*      (2018.01)
*G06F 8/77*      (2018.01)
*G06Q 10/101*    (2023.01)

(52) U.S. Cl.
CPC .................. *G06F 8/34* (2013.01); *G06F 8/77* (2013.01); *G06Q 10/101* (2013.01)

(58) Field of Classification Search
CPC ......... G06Q 10/101; G06F 8/77; G06F 16/00; G06F 8/65; G06F 8/34
See application file for complete search history.

(56) References Cited

U.S. PATENT DOCUMENTS

| | | |
|---|---|---|
| 10,949,333 B1 | 3/2021 | Malde et al. |
| 11,307,971 B1 | 4/2022 | Weldemariam et al. |
| 11,429,384 B1 | 8/2022 | Navert et al. |
| 11,573,921 B1 * | 2/2023 | Itani ........................ G06F 21/64 |
| 2017/0010881 A1 * | 1/2017 | Kawazu .................. G06F 8/654 |
| 2017/0034023 A1 * | 2/2017 | Nickolov ............ H04L 43/0817 |
| 2019/0095315 A1 * | 3/2019 | Zanbar ................ G06F 11/3676 |
| 2021/0133091 A1 | 5/2021 | Pillai et al. |
| 2021/0141718 A1 * | 5/2021 | Sandhu ...................... G06F 8/60 |
| 2021/0144168 A1 * | 5/2021 | Vester ...................... G06F 9/451 |
| 2023/0028708 A1 * | 1/2023 | Basel ...................... G06N 20/00 |
| 2023/0107104 A1 * | 4/2023 | Nash ...................... G06F 21/53 726/1 |
| 2023/0222051 A1 | 7/2023 | Priyanka et al. |
| 2025/0060962 A1 * | 2/2025 | Tornhill .................... G06F 8/77 |

FOREIGN PATENT DOCUMENTS

CN       113296808 A   *   8/2021

* cited by examiner

*Primary Examiner* — Noor Alkhateeb
(74) *Attorney, Agent, or Firm* — PEARL COHEN ZEDEK LATZER BARATZ LLP

(57) ABSTRACT

A device, system and method is provided for multiple editors to collaboratively edit shared program code. The code quality may be measured for each ith edit. A dynamic minimum code quality threshold may be a function of a maximum of the measured code qualities of previous $1, \ldots, i-1$ edits. The ith edit's measured code quality may be compared to the dynamic minimum code quality threshold. Each ith edit may be validated, and integrated to alter the shared code, if its measured code quality is greater than or equal to the dynamic minimum code quality threshold. The dynamic minimum code quality threshold may be increased as a function of] each ith edit's measured code quality that is greater than the maximum of previous $1, \ldots, i-1$ edits' measured code qualities (the previous dynamic minimum code quality threshold).

20 Claims, 3 Drawing Sheets

DYNAMIC PROGRAM CODE ANALYZER TO IMPROVE CODE QUALITY

FIELD OF THE INVENTION

The present invention relates generally to collaborative software development environments in which multiple editors coordinate to co-edit shared programming code, and more specifically, to improving the quality of the shared programming code.

BACKGROUND OF THE INVENTION

Collaborative software development environments coordinate multiple program code editors. Each code editor typically edits a local copy of shared program code and tests those edits locally. The editor may then raise a pull request (PR) containing the editor's local changes to globally load and merge those changes into a main branch of the shared program code so that other editors can use it.

For code quality assurance, once the PR is raised, a continuous integration continuous deployment (CICD) pipeline may run a code quality check on the PR. The code quality check is run once on each received set of program code, first on the initial starting state of the shared code, and then on each new block of locally edited changes to the code. The code quality check tests that the quality of each new block of code is greater than or equal to a minimum allowable quality set to the initial starting quality of the shared code, as a prerequisite for integrating the local edit change into the shared code. This ensures the code quality does not degrade over time below this minimum initial baseline quality. The quality of the shared code is checked only once in its initial state, and is never rechecked, so the prerequisite minimum allowable quality threshold set to this initial quality is static and fixed over the life of collaborative code editing (see e.g., "Static error threshold" in FIG. 1). The code quality over the life of collaborative code editing thus toggles slightly above this static minimum allowable quality threshold (see e.g., toggling Code Quality with "Static code validation" in FIG. 1), thereby maintaining an average code quality that is at least (and generally slightly greater than) the baseline minimum allowable quality threshold, but that in general does not significantly improve.

Accordingly, there is a longstanding need in the art to improve the quality of shared code as it is collaboratively edited by multiple editors.

SUMMARY OF THE INVENTION

Embodiments of the invention solve this longstanding need in the art to improve the quality of shared code as it is collaboratively edited by multiple editors by providing a dynamic code analyzer. Whereas a conventional static code analyzer executes a static code quality test to validate code edits (comparing the quality of code edits to a single fixed minimum allowable quality threshold, e.g., "Static error threshold" in FIG. 1), a dynamic code analyzer according to embodiments of the invention executes a dynamic code quality test to validate code edits (comparing the quality of code edits to a dynamic variable minimum allowable quality threshold that changes over the life of collaborative code editing). The dynamic code analyzer may repeatedly determine and resample the quality of the shared code at a plurality of times (e.g., upon receiving each new code edit in a new PR). When a new code edit improves the overall quality of the shared code, the dynamic code analyzer may increase the dynamic minimum allowable quality threshold to be equal to (or increase as a function of) the new resampled overall code quality (that is relatively higher than the previous minimum allowable quality threshold and the relatively lower previously sampled code quality to which it is set). When a new code edit decreases the overall quality of the shared code, however, the dynamic code analyzer does not alter the dynamic minimum allowable quality threshold, so the new updated overall code quality does not decrease after each incrementally increasing minimum threshold is reset. Each new edit's code quality thus incrementally and monotonically increases (does not decrease) the code quality test's minimum allowable quality threshold (see e.g., monotonically increasing Code Quality with "Dynamic code validation" in FIG. 1) to require incrementally greater and greater quality for code edits to be validated and incorporated over time, thus improving the overall quality of collaboratively editing the shared code. Because the dynamic minimum allowable threshold monotonically increases over time, as long as there is a single code edit that has a higher quality than the initial code, any subsequent code edit that has a quality lower than the single code edit's quality and higher than the initial code's quality, which would have been validated and integrated into the shared code by the conventional static code quality test (degrading the overall code quality), will be rejected (not integrated into the shared code) by the dynamic code quality test according to embodiments of the invention (not degrading, but maintaining, the overall code quality). Thus, the dynamic minimum allowable quality threshold according to embodiments of the invention (e.g., monotonically increasing Code Quality with "Dynamic code validation" in FIG. 1) improves the overall quality of the shared code compared to its conventional quality (e.g., toggling Code Quality with "Static code validation" in FIG. 1) set by the conventional static minimum allowable quality threshold (e.g., "Static error threshold" in FIG. 1).

In accordance with an embodiment of the invention, a device, system and method is provided for multiple editors to collaboratively edit shared program code. A sequence of edit requests may be received from the multiple editors, each request comprising an edit to alter the shared program code. For each ith edit in the sequence of edit requests, the code quality of the shared program code altered by the edit may be measured. A dynamic minimum code quality threshold may be stored defining a dynamic prerequisite for editing the shared program code. The dynamic minimum code quality threshold may be dynamically set to be a function of a maximum of the measured code qualities of the shared program code altered by each of previous 1, . . . , i–1 edits in the sequence of edit requests. The measured code quality of the shared program code altered by each ith edit may be compared to the dynamic minimum code quality threshold. Each ith edit may be validated if the measured code quality of the shared program code altered by the ith edit is greater than or equal to the dynamic minimum code quality threshold. The shared program code may be altered by each validated edit (in a centralized version or peer-to-peer of the shared program code) accessible to all or the other of the multiple editors. The dynamic minimum code quality threshold may be increased for each ith edit to be a function of the measured code quality of the shared program code altered by the ith edit if the measured code quality of the shared program code altered by the ith edit is greater than the maximum of the measured code qualities of the shared program code altered by each of the previous 1, . . . , i–1 edits in the sequence of edit requests.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
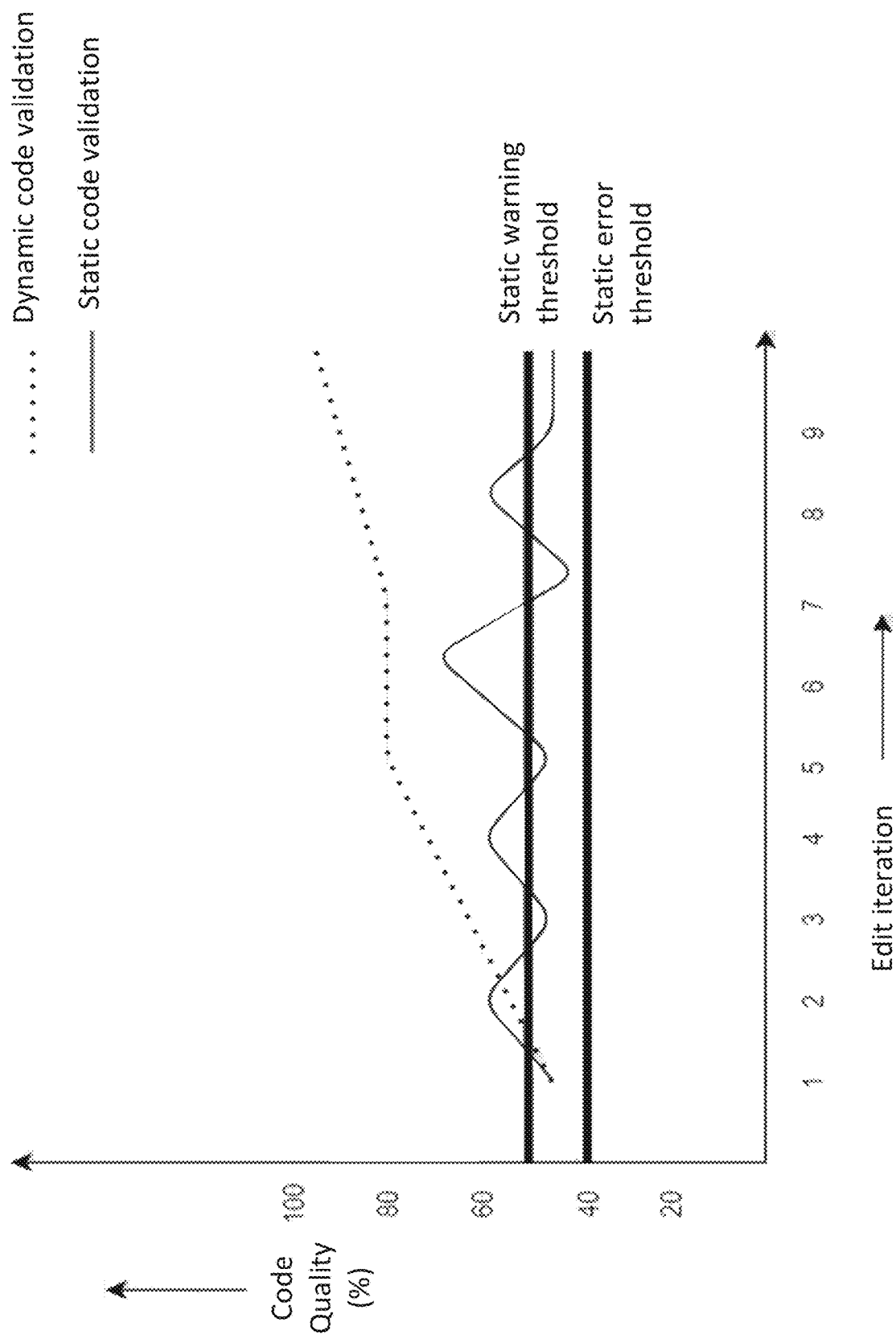
FIG. 1 is a graph of code quality (y-axis) vs. edit iteration (x-axis) comparing conventional static code validation and dynamic code validation in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Code quality may quantitatively measure accuracy, operational stability, and/or validity of a program code. Code quality of a set of code and/or an edit thereto may measure the original or edited code in its entirety or a portion thereof (e.g., one or more code branches, blocks, subset of code lines, only the code edit, etc.). Code quality may measure code coverage, which is proportional to the percentage of code (e.g., code lines, blocks, branches, iterations or other code or execution units) that passes an accuracy test. In one embodiment, code coverage may measure the percentage of lines of a program's code verified to be accurate for all (or an above threshold number) of one or more test cases. For example, test cases with mock data may be embedded in the program code (e.g., where the number of test cases is typically based on the number of code permutations to effectively test all lines of code). A test case may include inputs linked to expected respective outputs to test if executing a portion of code with those inputs generates outputs that matches the expected respective outputs (validating the portion of code) or not (invalidating the portion of code). In one example, a program that includes 100 lines of code and 5 test cases that test code lines 1-50, leaving code lines 51-100 untested, has a 50% code coverage. Additionally or alternatively, code quality may measure other or additional parameters to code coverage, e.g., code smells, code duplicity or redundancy, security rating, vulnerability, reliability rating, etc. It may be appreciated that increasing code quality may refer to increasing some of these parameters (e.g., code coverage, security rating, reliability rating) and decreasing other of these parameters (e.g., code smells, code duplicity or redundancy, vulnerability). In some embodiments, code quality may measure multiple of these parameters, separately (e.g., in parallel or in sequence) or combined (e.g., as an average, such as, a weighted or unweighted sum) of multiple of these parameters. A single value of code quality (either representing a single parameter or an average of multiple parameters) may be tracked, monotonically increased, and validated for integrating edits. Additionally or alternatively, multiple values of code quality (of multiple different parameters) may be independently tracked, monotonically increased, and validated for integrating edits. In some embodiments, an edit may need to pass multiple validation tests for all (or a subset of) of the multiple respective values of code quality. To improve efficiency, when validation is needed for all tests, the tests may be executed in sequence, stopping testing when any one test is invalidated, to prevent executing unnecessary tests for invalid edits. When all of these multiple quality parameters are tested in combination, validating edits based thereon may improve the overall quality of the shared code. When each of these multiple quality parameters is tested separately, validating edits based thereon may improve that individual parameter of the shared code. For example, testing the code coverage of edits may incrementally increase the code coverage of the shared code, testing code smells of edits may incrementally decrease the code smells of the shared code, testing code duplicity or redundancy caused by edits may incrementally decrease the code duplicity or redundancy in the shared code, testing the security rating of edits may incrementally increase the security of the shared code, testing the vulnerability of edits may incrementally decrease the vulnerability of the shared code, and/or testing the reliability rating of edits may incrementally increase the reliability of the shared code.

Figure 2:
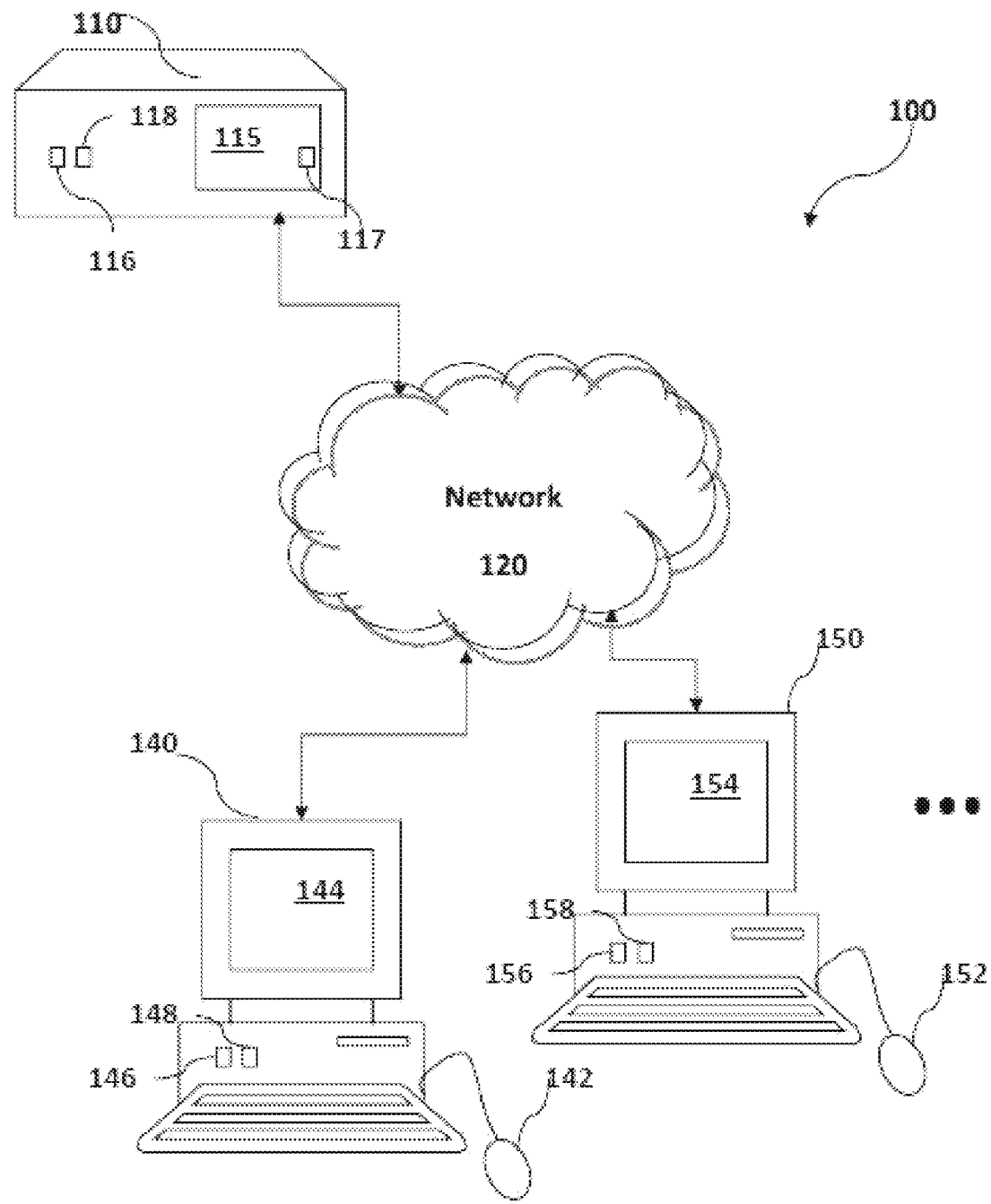
FIG. 2 is a schematic illustration of a collaborative editing system for executing a dynamic program code analyzer to improve code quality, in accordance with some embodiments of the invention.

A program code analyzer (e.g., executed at server(s) 110 of FIG. 2) may measure the initial quality of shared code integrated into a main branch accessible to multiple program editors (e.g., operating computers 140, 150, . . . of FIG. 2). The program code analyzer sets a minimum allowable quality threshold for editing the shared code to be this initial code quality. Each time an editor sends a request to edit the shared code (e.g., in a PR), the program code analyzer tests the quality of the shared code integrating the edit and validates and integrates the edit into the main branch of the shared code if the edited code quality is greater than or equal to the minimum allowable quality threshold. If, however, the edit code quality is less than the minimum allowable quality threshold, the edit is invalidated and not integrated into the shared code. The program code analyzer may also have additional thresholds, e.g., a warning threshold, which if breached still allows validation but causes a warning to be transmitted. In some embodiments, an error notification or report may be transmitted for invalidated edits comprising, for example, a matrix of parameters indicating a root cause of the invalidation, such as, a number of validated and/or invalidated edits or PRs, its measured code quality, a degree or amount by which it deviates from the threshold, specific reasons, code lines, etc. responsible for the failed validation, etc. Error reports may allow developers to understand the nature or reasons for edit failure to allow better code or adjustment of the threshold or a validation margin of error to allow more edits to be validated. In various embodiments, any of these indications, notifications, or reports may be transmitted from a centralized or peer device executing the program code analyzer to the originating editor (e.g., source of the PR) and/or other editors or parties (e.g., a project manager).

A conventional static program code analyzer only measures the initial quality of shared code once to set it as a fixed minimum allowable quality for the life of editing the shared code (e.g., "Static error threshold" in FIG. 1). The shared code's quality thus toggles closely above this static minimum (e.g., toggling Code Quality with "Static code validation" in FIG. 1).

To improve the shared code's quality, embodiments of the invention provide a dynamic program code analyzer to incrementally raise the minimum allowable quality over the life of editing the shared code (e.g., monotonically increasing Code Quality with "Dynamic code validation" in FIG. 1). Each time an edit increases the overall quality of the shared code (e.g., X %) above the minimum allowable quality threshold (e.g., Y %, where Y<X), the dynamic program code analyzer may increase the minimum allowable quality threshold to be equal to (or increased as a function of) the new higher overall quality (e.g., to X %). The minimum allowable quality threshold may increase as a function of, for example, proportional to or based on a rate of change or stability of, the new higher code quality. The dynamic program code analyzer may dynamically track the code quality as it toggles upward for each quality-improving code edit, and incrementally or continuously monotonically increase the minimum allowable quality for validating edits upward to match (or as a function of) the increase in the code quality. Dynamically monotonically increasing the minimum allowable quality over time thus ensures future edits will be validated that maintain or increase a future code quality, that toggles above the minimum, increasing on average at a rate equal to or greater than the rate of the monotonically increasing minimum.

In some embodiments, the minimum allowable quality is increased in real-time, e.g., each time a new edit improving the shared code quality is received (e.g., in a PR), measured for quality, validated or integrated into the shared code. In some embodiments, the minimum allowable quality is increased at a time delay after a quality-increasing edit is received, measured, validated or integrated, for example, at a predetermined time delay thereafter (e.g., one minute, hour, or day) or after a subsequent predetermined event occurs such as after a subsequent edit is received, measured, validated or integrated with a quality equal to or greater than the initial edit's quality (e.g., to ensure the minimum allowable quality is not raised prohibitively high or based on an anomalous or outlier initial edit quality). In some embodiments, the minimum allowable quality is increased only if and/or after an above threshold number of subsequent edits, or subsequent edits received over an above threshold duration of time thereafter, are validated as having quality equal to or above that minimum. In some embodiments, the minimum allowable quality is increased only up to a threshold change or cap (e.g., a jump of 5-10% or less), for example, even if it increases the quality above this threshold. In some embodiments, if an edit increases the code quality above a threshold, the minimum allowable quality is not increased based on the edit at all (e.g., ignoring the quality effects on edits that are anomalous or outliers). In some embodiments, any of the above confirmation tests may be selectively activated or relevant, for example, only when the increase in quality is above a threshold (e.g., a significant jump in 10% or greater percent quality). In various embodiments, any of these predetermined values may be tunable or adjustable to increase or decrease the amounts, rates or conditions for increasing the minimum allowable quality threshold.

In some embodiments, the amount or rate of increase in the minimum allowable quality threshold may be equal to, proportional to, or another function of the amount or rate of increase in the code quality due to the most recent new single edit, a predetermined number of most recent edits, or all edits to the shared code. In various embodiments, each edit is validated independently, or validated as a combined group of edits of a predetermined number, over a predetermined time, related to a same code section or branch or originating from the same one or more users, accounts, or devices. For example, the minimum allowable quality threshold may be increased together for a group of edits based on their combined (e.g., average or weighted sum of) quality improvement. When multiple independent types of quality parameters are tracked, the amount or rate of increase in a combined or independent multi-dimensional minimum allowable quality threshold(s) may be equal to, or proportional to, or another function of the amount or rate of increase in the combined (e.g., weighted or unweighted sum) or respective independent multi-dimensional code qualities due to new edits. In one embodiment, the minimum allowable quality threshold may increase incrementally as a stair-step function matching the incremental stair-step code quality increase of the shared code. In another embodiment, the minimum allowable quality threshold may increase as a weighted sum of N most-recently integrated edits, each weighted inversely proportionally to the order or time in which they were integrated (e.g., the most recently integrated edit weighing the most). In some embodiments, the amount or rate of increase in the minimum allowable quality threshold may be weighted based on the amount or degree of code changed by the edits (e.g., percentage of code lines, blocks, or other code units edited). For example, an edit to a relatively greater number of code lines or a larger code block may cause a greater increase (proportional to the changed number of lines or code size) in the minimum allowable quality threshold compared to an edit to a relatively fewer number of code lines or a smaller code block.

In some embodiments, the minimum allowable quality threshold may be an exact or absolute threshold (invalidating all edits having code quality below the threshold) or may be an approximate threshold (allowing edits having code quality within a margin of error of, e.g., +/−a percentage or proportion of, the threshold). The margin of error may be predetermined and/or tunable to adjust the edit quality confidence range. Additionally or alternatively, the margin of error may be the previous one or more most-recent lower minimum allowable quality threshold(s).

The dynamic program code analyzer may test or resample the overall code quality continuously, periodically, or triggered by an event, such as, every one or more times a PR is raised. For example, a team of 5 code editors, each sending on average 6 code edits per day, may result in 30 code quality tests per day.

In some embodiments, the code quality analyzer, test and/or threshold may be toggled between dynamic and static states, for example, turning the quality improving embodiments disclosed herein on or off. In one embodiment, an override of the dynamic code quality analyzer, test and/or threshold may be executed, e.g., to integrate an essential edit into the shared code as an exception, even when its quality is below the initial and/or improved threshold. In some embodiments, when multiple independent types of quality parameters are independently tracked, each parameter's dynamic code quality analyzer, test and/or threshold may be toggled on/off, for example, based on a trigger. The trigger for tracking the security rating may be, e.g., an above threshold number of programmers, an above threshold number of or new libraries, one or more library version(s) that are known to be vulnerable (e.g., when the PR containing the edit request uses a library vulnerable to attack), etc. to improve the security of the shared code.

As the minimum allowable quality threshold increases monotonically, edits may or may not be validated and integrated into the shared code based on the timing or order the edits are received. For example, an edit that is above the threshold at one time may subsequently be below the threshold as it is increased. Accordingly, in some embodiments, when a group of edits are received simultaneously, at overlapping times or at proximate times (e.g., separated by below threshold times, such as up to minutes, an hour or a day), the dynamic program code analyzer may order or triage testing of the edits in non-chronological received order of increasing quality (e.g., from lowest to highest quality to defer the threshold increase and validate and integrate the most edits) or decreasing quality (e.g., from highest to lowest quality to hasten the threshold increase and to validate and integrate the fewest edits).

Reference is made to FIG. 1, which is a graph of code quality (y-axis) vs. edit iteration (x-axis) comparing conventional static code validation and dynamic code validation in accordance with some embodiments of the invention. Each code analyzer executes a validation test as a prerequisite for incorporating edits into shared program code. The code analyzer validates each new ith edit sequentially received in each ith iteration (e.g., in each sequential PR) in the x-axis if the edit has a measured code quality that is greater than or equal to a minimum allowable quality or error threshold in the y-axis.

The conventional static code analyzer executes an initial quality check on an initial unedited state of the shared program code and sets the prerequisite minimum allowable quality or error threshold for validating edits to this static initial quality. This static error threshold is fixed and unchanged over the lifetime of collaboratively editing the shared code. The static code analyzer may also set a static warning threshold, such that edits with measured code qualities below which are still validated, but trigger a warning transmitted to the originating editor and/or other editors or parties (e.g., a project manager) to indicate the edit's code quality is below a warning threshold. A static error threshold typically causes the code quality to toggle slightly above this static minimum allowable quality threshold over the life of collaborative code editing (see e.g., toggling Code Quality above Static code validation), thereby maintaining a stable or approximately constant average code quality that is at least (and generally slightly greater than) the baseline minimum allowable quality threshold, but that typically does not significantly improve over the life of collaborative code editing.

In contrast, the dynamic code analyzer in accordance with embodiments of the invention may monotonically increase the dynamic minimum code quality threshold for each ith edit each time the ith edit's measured quality exceeds the previous threshold (set to the previous maximum of the previous 1, . . . , i−1 edits' measured code qualities). Accordingly, the overall shared code quality (validated above this threshold) likewise increases, toggling above, and on average increasing in tandem at the same or similar rate to, this monotonically increasing dynamic minimum code quality threshold (see e.g., Dynamic code validation).

Embodiments of the invention may incrementally and/or continuously increase the average shared code quality since it is validated to be greater than or equal to the monotonically increasing minimum or error code quality threshold over the life of its collaborative editing. As the average code quality toggles upward, the dynamic code analyzer may dynamically track and incrementally or continuously shift the dynamic minimum code quality threshold to match its upward mobility, creating a continuous upward feedback loop between the increasing shared code quality and the increasing dynamic minimum code quality threshold. The dynamic code analyzer may ensure an overall increase in the average code quality if there is at least one edit that has a higher quality than the initial code and at least one subsequent edit that has a quality between the initial code quality and the higher quality (validated by the static threshold and degrading the overall code quality, but rejected by the dynamic threshold to preserve the higher quality).

In some embodiments, to move code quality in the upward direction, dynamic validation is implemented as part of a PR build job, which may test whether the code quality (e.g., code coverage) of a PR job is greater than or equal to that of the master one or the destination branch. And if not then, block that PR from merging or send a notification to one or more editors in one or more respective groups.

A non-limiting demonstrative example of code validation follows using the below metrics:

Current code coverage of Master branch—55%.
PR Code Coverage—54%.
Static Quality Gate code coverage value (minimum code quality threshold)—50%.

In the above example, the PR may be raised to merge its edit into the Master branch. If the PR is allowed to merge, then it will reduce the overall code coverage by 1%. Because the PR Code Coverage (54%) is greater than Quality gate code coverage value (50%), the PR is allowed (not blocked) from merging by a conventional static code analyzer, and as a result the programmer request is executed to merge the code in the PR into the Master branch. After this merge, the Master branch's code coverage will decrease to 54% (from 55% before the merge).

Embodiments of the invention prevent this code quality reduction by providing a dynamic code analyzer. The dynamic code analyzer may be implemented as a plug-and-play, for example, executed as part of the native PR validation. The dynamic code analyzer may take inputs like PR stash details and action flag. The dynamic code analyzer may execute a code script that performs logic that may determine if code coverage resulting from its edit will be higher than the current code coverage or not. The dynamic code analyzer may execute the actions:

Analyze PR Stash Details to fetch the PRs and Destination branch sonar details.
Analyze Action Flag to determine if validation fails then what action needs to be taken.

Benefits-If this utility scan is enabled as part of a PR job, then:

Code quality will, generally on average, only increase (e.g., increasing in the y-axis of the graph in FIG. 1) as more edits are merged over the life of collaborative code editing (e.g., as the x-axis increases in the graph in FIG. 1).
Future MVP goals may be efficiently achieved.
Maximum code quality may be achieved on new code and quality final code is promoted to a production environment.

Reference is made to FIG. 2, which schematically illustrates a collaborative editing system 100, in accordance with some embodiments of the invention. Collaborative editing system 100 comprises one or more server(s) 110 for executing a dynamic program code analyzer 117 to test and validate local edits received (e.g., in PRs) from multiple respective editor computers 140, 150, . . . and incorporate those validated code edits into shared program code (e.g., stored in database 115). Dynamic program code analyzer 117 may iteratively and incrementally monotonically increase the minimum allowable code quality for local edits to be validated and integrated into the shared program code (e.g., monotonically increasing Code Quality with "Dynamic code validation" in FIG. 1). The minimum allowable code quality may be increased to an improved quality of incorporating each new proposed code edit (and may remain constant otherwise). This way, the test for validating requested code edits imposes an incrementally higher and higher minimum allowable code quality to incorporate those edits, thus achieving higher quality shared program code compared to conventionally constant minimum allowable code quality code (e.g., constant "Static error threshold" in FIG. 1).

The above described embodiments may be executed using any single or combination of devices and/or components of system 100 of FIG. 2. The devices of system 100 may be used to operate one or more devices, data structures, parties or services described in reference to FIG. 1.

System 100 may include one or more server(s) 110, database(s) 115, and/or editor computer(s) 140, 150, . . . , any of which may operate in a collaborative software development environment to co-edit shared program code. Any or all of system 100 devices may be connected via one or more network(s) 120.

Figure 3:
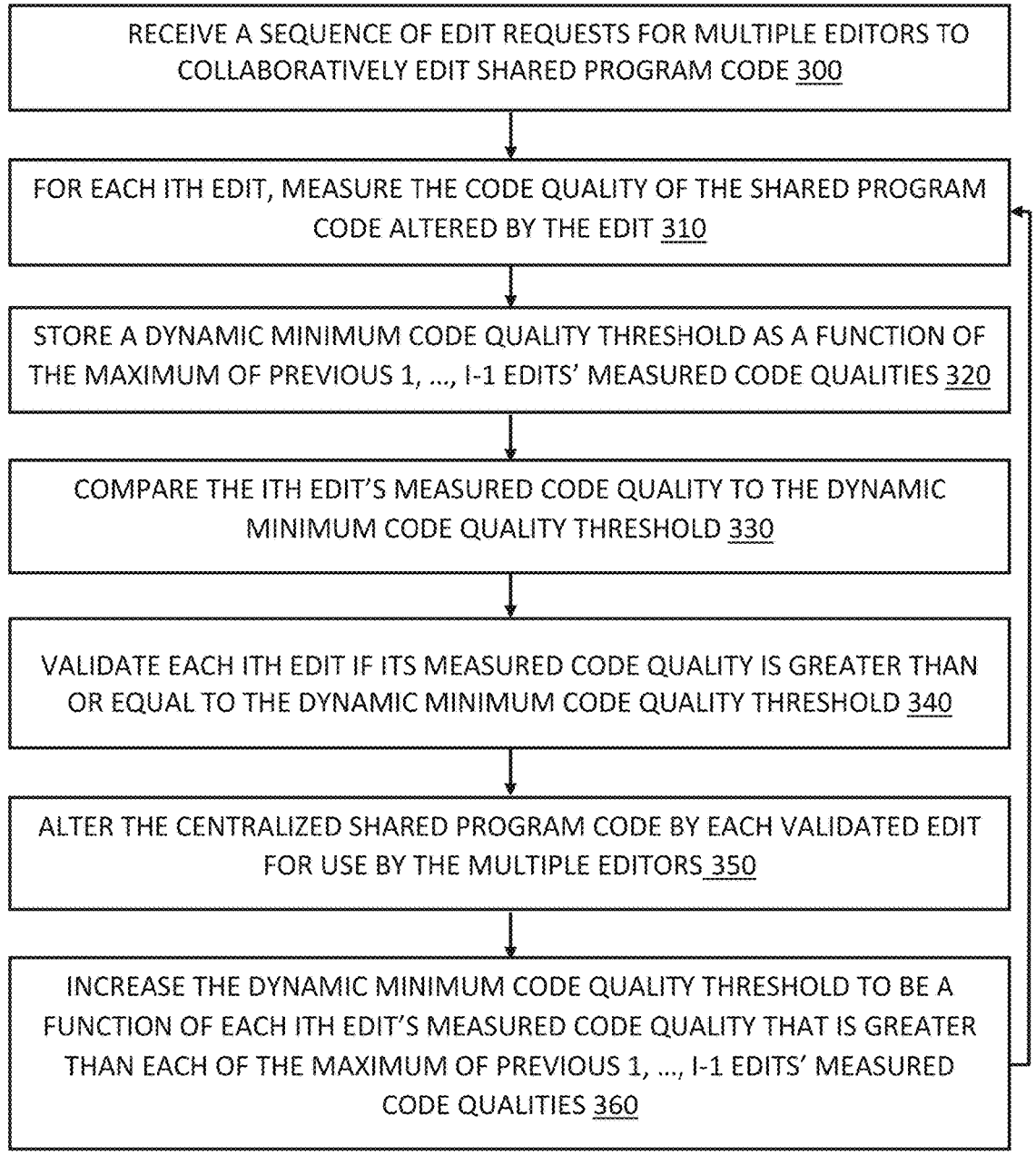
FIG. 3 is a flowchart of a method for executing a dynamic program code analyzer to improve code quality, in accordance with some embodiments of the invention.

Database 115 may include software processes or applications for storing and retrieving shared program code, PRs, edits of the shared program code, and/or dynamic program code analyzer 117 such as data structures used by and described in reference to FIGS. 1 and 3. Dynamic program code analyzer 117 may also include code (e.g., software code) or logic, e.g., to dynamically track the shared code quality based on each received edit, and incrementally or continuously monotonically increase the minimum allowable quality threshold based on those received edits that improve the tracked shared code quality for validating future edits (subsequent to the current received edit) to match (or as a function of) the increase in the shared code quality. Database 115 may be internal or external to one or more of server(s) 110 and/or editor computer(s) 140 and/or 150 (not shown) and may be connected thereto by a local or remote and a wired or wireless connection. In alternate embodiments, dynamic program code analyzer 117 may be stored in an alternate location separate from database 115, e.g., memory unit(s) 118, 148, and/or 158.

Editor computers 140 and 150 may be servers, personal computers, desktop computers, mobile computers, laptop computers, and notebook computers or any other suitable device such as a cellular telephone, personal digital assistant (PDA), video game console, etc., and may include wired or wireless connections or modems. Editor computers 140 and 150 may include one or more input devices 142 and 152, respectively, for operating a user interface running a local copy of the shared code and receiving input (e.g., edits in PR) from a user (e.g., via a pointing device, click-wheel or mouse, keys, touch screen, recorder/microphone, other input components). Editor computers 140 and 150 may include one or more output devices 144 and 154 (e.g., a monitor or screen) for displaying data, e.g., via the user interface to a user provided by or for server(s) 110, such as, edits originating at other editor computers merged into the editor's local copy of the shared code.

Network 120, which connects server(s) 110 and editor computers 140 and 150, may be any public or private network such as the Internet. Access to network 120 may be through wire line, terrestrial wireless, satellite or other systems well known in the art.

Server(s) 110 and editor computers 140 and 150, may include one or more controller(s) or processor(s) 116, 146, and 156, respectively, for executing operations according to embodiments of the invention and one or more memory unit(s) 118, 148, and 158, respectively, for storing data (e.g., shared program code, PRs, edits of the shared program code, shared code quality values over time, quality thresholds over time and/or statistics thereof) and/or instructions (e.g., software for tracking code quality, executing code quality tests, validating edits, and merging validated edits into the shared code according to embodiments of the invention) executable by the processor(s). Processor(s) 116, 146, and/or 156 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 118, 148, and/or 158 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Embodiments of the invention may include an article such as a computer or processor readable non-transitory storage medium, such as for example a memory, a disk drive, or a USB flash memory device (e.g., memory unit(s) 118, 148, and/or 158 of FIG. 2) encoding, including or storing instructions, e.g., computer-executable instructions, which when executed by a processor or controller (e.g., controller(s) or processor(s) 116, 146, and/or 156 of FIG. 2), cause the processor or controller to carry out methods disclosed herein.

Reference is made to FIG. 3, which is a flowchart of a method for multiple editors to collaboratively edit shared program code by executing a dynamic program code analyzer to improve the shared code quality, in accordance with some embodiments of the invention. Operations described in reference to FIG. 3 may be executed using devices described in reference to FIG. 2, for example, at a centralized server 110 using one or more processor(s) (e.g., controller 116) to coordinate multiple editor computers 140, 150, . . . , and/or at one or more editor computers 140, 150, . . . for peer-to-peer (decentralized) collaboration in FIG. 2.

In operation 300, one or more processor(s) may receive a sequence of edit requests from the multiple editors, each request comprising an edit to alter the shared program code.

In operation 310, for each ith edit in the sequence of edit requests, one or more processor(s) may measure the code quality of the shared program code altered by the edit.

The code quality may include one or more types of code quality selected from the group consisting of: code coverage, code smells, code duplicity or redundancy, security rating, vulnerability and reliability rating. In some embodiments, the code quality is a measure of multiple independent types of code quality and the dynamic minimum code quality threshold that is monotonically increased as an independent function for each different type of code quality or as a combined function aggregating multiple measures of the multiple respective code quality types.

In operation 320, one or more processor(s) may store a dynamic minimum code quality threshold defining a dynamic prerequisite for editing the shared program code, wherein the dynamic minimum code quality threshold is dynamically set to be a function of a maximum of the measured code qualities of the shared program code altered by each of previous 1, . . . , i–1 edits in the sequence of edit requests.

In operation 330, one or more processor(s) may compare the measured code quality of the shared program code altered by each ith edit to the dynamic minimum code quality threshold.

In operation 340, one or more processor(s) may validate each ith edit if the measured code quality of the shared program code altered by the ith edit is greater than or equal to the dynamic minimum code quality threshold. In some embodiments, one or more processor(s) may invalidate each ith edit if the measured code quality of the shared program code altered by the ith edit is less than the dynamic minimum code quality threshold. In some embodiments, each ith edit may only be validated if the measured code quality of the shared program code altered by the ith edit is strictly or exactly greater than or equal to the dynamic minimum code quality threshold. In some embodiments, each ith edit may also be validated if the measured code quality of the shared program code altered by the ith edit is within a margin of error less than the dynamic minimum code quality threshold. In some embodiments, the ith edit is collectively validated in a group together with multiple edits, e.g., received from one or multiple different editor(s), and wherein the code quality is a measure of the shared program code altered collectively by the group of edits. In various embodiments, the dynamic minimum code quality threshold is increased in the current iteration upon validating the current iteration's ith edit, or in a subsequent iteration after one or more subsequent i+j edits are validated in a subsequent iteration based on the increased dynamic minimum code quality threshold.

In operation 350, one or more processor(s) may alter the shared program code by each validated edit (e.g., in a centralized version or peer-to-peer of the shared program code) accessible to all or the other non-originators of the multiple editors. In some embodiments, for each invalidated edit, one or more processor(s) may transmit an error notification or report to the originating editor from which the ith edit request was received, wherein the error notification comprises parameters indicating a root cause of the invalidation, such as, a number of validated and/or invalidated edits or PRs, its measured code quality, a degree or amount by which it deviates from the threshold, specific reasons, code lines, etc. to which the below-threshold code quality is attributed, etc.

In operation 360, one or more processor(s) may increase the dynamic minimum code quality threshold for each ith edit to be a function of the measured code quality of the shared program code altered by the ith edit if the measured code quality of the shared program code altered by the ith edit is greater than the maximum of the measured code qualities of the shared program code altered by each of the previous 1, . . . , i−1 edits in the sequence of edit requests. Otherwise, the dynamic minimum code quality threshold may remain constant and unchanged. In one embodiment, the dynamic minimum code quality threshold for each ith edit is monotonically increased to a value or at a rate equal to or proportional to a value or rate of monotonic increase in the measured code quality of the shared program code altered up to the ith edit. In one embodiment, when multiple types of quality parameters are tracked, the dynamic minimum code quality threshold for each ith edit is monotonically increased as a weighted sum of the N most-recently integrated edits from the sequence of edit requests, where e.g., each of the N most-recently integrated edits are weighted inversely proportional to the edit's order in the sequence of edit requests or a time of the edit request. Additionally or alternatively, the dynamic minimum code quality threshold for each ith edit is monotonically increased to a value or at a rate weighted based on an amount or degree of the shared program code altered by or up to the ith edit.

After operation 360, one or more processor(s) may increment the iteration by resetting the ith edit to that in the next of the sequence of edit requests. In the next iteration, the one or more processor(s) may use the increased (or unchanged) dynamic minimum code quality threshold as set in operation 360 to validate the next edit in the edit request sequence.

One or more processor(s) may iteratively repeat operations 310-360 for each single or multiple (fixed or dynamic number of) edits in the sequence of edit requests received in operation 300. Additional or different operations may be used, operations may be excluded, and different orders of operations may be used. For example, in some embodiments, when operation 340 does not validate an edit, operations 350-360 may be skipped.

In accordance with an embodiment of the invention, a device, system and method is provided for multiple editors to collaboratively edit shared program code. A dynamic minimum code quality threshold may be stored defining a dynamic prerequisite for editing the shared program code. A plurality of edit requests may be received from the multiple editors, each request comprising an edit requested to alter the shared program code. For each current edit request of the plurality of edit requests: the code quality of the shared program code altered by the edit may be measured, the edit may be validated if the measured code quality of the shared program code altered by the edit is greater than or equal to the dynamic minimum code quality threshold, if the edit is validated, the shared program code may be altered by the edit in a centralized version of the shared program code accessible to all or the other of the multiple editors, the dynamic minimum code quality threshold may be increased to be a function of the measured code quality if the measured code quality of the shared program code altered by the edit is greater than the dynamic minimum code quality threshold, the current edit request may be incremented to be a subsequent one of the plurality of edit requests for validation using the increased dynamic minimum code quality threshold. In some embodiments. The dynamic minimum code quality threshold may be increased to be a function of the measured code quality of the current edit request each time the measured code quality of the current edit request is greater than the dynamic minimum code quality threshold or a maximum of the measured code qualities of the previous edit requests.

While embodiments of the invention are described in reference to collaborative editing of multiple different users, it may also be used to improve the quality of code repeatedly edited by a single user.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

The invention claimed is:

1. A method for multiple editors to collaboratively edit shared program code, the method comprising:
   receiving a sequence of edit requests from the multiple editors, each request comprising an edit to alter the shared program code;
   for each ith edit in the sequence of edit requests, measuring code quality of the shared program code altered by the edit;
   storing a dynamic minimum code quality threshold defining a dynamic prerequisite for editing the shared program code, wherein the dynamic minimum code quality threshold is initially set as a function of an initial measure of the code quality of the shared program code and the dynamic minimum code quality threshold is dynamically set as a function of a maximum of the measured code qualities of the shared program code altered by each of previous 1, . . . , i−1 edits in the sequence of edit requests;
   comparing the measured code quality of the shared program code altered by each ith edit to the dynamic minimum code quality threshold;
   validating each ith edit if the measured code quality of the shared program code altered by the ith edit is greater than or equal to the dynamic minimum code quality threshold;
   altering the shared program code by each validated edit accessible to one or more of the multiple editors; and
   increasing the dynamic minimum code quality threshold for each ith edit as a function of the measured code quality of the shared program code altered by the ith edit if the measured code quality of the shared program code altered by the ith edit is greater than the maximum of the measured code qualities of the shared program code altered by each of the previous 1, . . . , i−1 edits in the sequence of edit requests.

2. The method of claim 1, wherein the code quality is a measure of multiple independent types of code quality and the dynamic minimum code quality threshold is monotonically increased as an independent function for each different type of code quality or as a combined function aggregating multiple measures of the multiple respective code quality types.

3. The method of claim 1, wherein the dynamic minimum code quality threshold for each ith edit is monotonically increased to a value or at a rate equal to or proportional to a value or rate of monotonic increase in the measured code quality of the shared program code altered up to the ith edit.

4. The method of claim 1, wherein the dynamic minimum code quality threshold for each ith edit is monotonically increased as a weighted sum of N most-recently integrated edits from the sequence of edit requests, each of the N most-recently integrated edits weighted inversely proportionally to the edit's order in the sequence of edit requests or a time of the edit request.

5. The method of claim 1, wherein the dynamic minimum code quality threshold for each ith edit is monotonically increased to a value or at a rate weighted based on an amount or degree of the shared program code altered by or up to the ith edit.

6. The method of claim 1 comprising validating each ith edit if the measured code quality of the shared program code altered by the ith edit is within a margin of error less than the dynamic minimum code quality threshold.

7. The method of claim 1, wherein the ith edit is collectively validated in a group of multiple edits received from one or multiple different editors, and wherein the code quality is a measure of the shared program code altered collectively by the group of multiple edits.

8. The method of claim 1, wherein the dynamic minimum code quality threshold is only increased for each ith edit after one or more subsequent i+j edits are validated based on the increased dynamic minimum code quality threshold.

9. The method of claim 1, wherein the code quality comprises one or more types of code quality selected from the group consisting of: code coverage, code smells, code duplicity or redundancy, security rating, vulnerability and reliability rating.

10. The method of claim 1 comprising: invalidating each ith edit if the measured code quality of the shared program code altered by the ith edit is less than the dynamic minimum code quality threshold; and transmitting an error notification to an editor from which the ith edit request was received, wherein the error notification comprises parameters indicating a root cause of the invalidation.

11. A method for multiple editors to collaboratively edit shared program code, the method comprising:
   storing a dynamic minimum code quality threshold defining a dynamic prerequisite for editing the shared program code, wherein the dynamic minimum code quality threshold is initially set as a function of an initial measure of code quality of the shared program code;
   receiving a plurality of edit requests from the multiple editors, each request comprising an edit requested to alter the shared program code;
   for each current edit request of the plurality of edit requests:
   measuring the code quality of the shared program code altered by the edit;
   validating the edit if the measured code quality of the shared program code altered by the edit is greater than or equal to the dynamic minimum code quality threshold; and
   if the edit is validated, altering the shared program code by the edit accessible to one or more of the multiple editors;
   if the measured code quality of the shared program code altered by the edit is greater than the dynamic minimum code quality threshold, increasing the dynamic minimum code quality threshold to be as a function of the measured code quality; and incrementing the current edit request to be as a subsequent one of the plurality of edit requests for validation using the increased dynamic minimum code quality threshold.

12. The method of claim 11 comprising increasing the dynamic minimum code quality threshold as a function of the measured code quality of the current edit request each time the measured code quality of the current edit request is greater than the dynamic minimum code quality threshold or a maximum of the measured code qualities of the previous edit requests.

13. A system to coordinate multiple editor devices to collaboratively edit shared program code, the system comprising:
one or more memories configured to store the shared program code; and
one or more processors configured to:
receive a sequence of edit requests from the multiple editor devices, each request comprising an edit to alter the shared program code,
for each ith edit in the sequence of edit requests, measure code quality of the shared program code altered by the edit,
store a dynamic minimum code quality threshold defining a dynamic prerequisite for editing the shared program code, wherein the dynamic minimum code quality threshold is initially set as a function of an initial measure of the code quality of the shared program code and the dynamic minimum code quality threshold is dynamically set as a function of a maximum of the measured code qualities of the shared program code altered by each of previous 1, . . . , i−1 edits in the sequence of edit requests,
compare the measured code quality of the shared program code altered by each ith edit to the dynamic minimum code quality threshold,
validate each ith edit if the measured code quality of the shared program code altered by the ith edit is greater than or equal to the dynamic minimum code quality threshold,
alter the shared program code by each validated edit accessible to one or more of the multiple editor devices, and
increasing the dynamic minimum code quality threshold for each ith edit to be as a function of the measured code quality of the shared program code altered by the ith edit if the measured code quality of the shared program code altered by the ith edit is greater than the maximum of the measured code qualities of the shared program code altered by each of the previous 1, . . . , i−1 edits in the sequence of edit requests.

14. The system of claim 13, wherein the one or more processors are configured to measure the code quality of multiple independent types of code quality and monotonically increase the dynamic minimum code quality threshold as an independent function for each different type of code quality or as a combined function aggregating multiple measures of the multiple respective code quality types.

15. The system of claim 13, wherein the one or more processors are configured to monotonically increase the dynamic minimum code quality threshold for each ith to a value or at a rate equal to or proportional to a value or rate of monotonic increase in the measured code quality of the shared program code altered up to the ith edit.

16. The system of claim 13, wherein the one or more processors are configured to monotonically increase the dynamic minimum code quality threshold for each ith edit as a weighted sum of N most-recently integrated edits from the sequence of edit requests, each of the N most-recently integrated edits weighted inversely proportionally to the edit's order in the sequence of edit requests or a time of the edit request.

17. The system of claim 13, wherein the one or more processors are configured to monotonically increase the dynamic minimum code quality threshold for each ith edit to a value or at a rate weighted based on an amount or degree of the shared program code altered by or up to the ith edit.

18. The system of claim 13, wherein the one or more processors are configured to validate each ith edit if the measured code quality of the shared program code altered by the ith edit is within a margin of error less than the dynamic minimum code quality threshold.

19. The system of claim 13, wherein the code quality comprises one or more types of code quality selected from the group consisting of: code coverage, code smells, code duplicity or redundancy, security rating, vulnerability and reliability rating.

20. The system of claim 13, wherein the one or more processors are configured to: invalidate each ith edit if the measured code quality of the shared program code altered by the ith edit is less than the dynamic minimum code quality threshold, and transmit an error notification to an editor from which the ith edit request was received, wherein the error notification comprises parameters indicating a root cause of the invalidation.

\* \* \* \* \*